(12) United States Patent
Benbuk et al.

(10) Patent No.: US 11,626,755 B2
(45) Date of Patent: Apr. 11, 2023

(54) ULTRA-LOW-POWER MULTI-POWER-MODE ADDRESS DETECTOR FOR COMBINED RF CHARGING AND WAKE-UP AND METHODS OF USE

(71) Applicant: American University of Beirut, Beirut (LB)

(72) Inventors: Ahmed Abed Benbuk, Beirut (LB); Nour Kouzayha, North Lebanon (LB); Joseph Costantine, Albuquerque, NM (US); Zaher Dawy, Beirut (LB)

(73) Assignee: American University of Beirut, Beirut (LB)

( * ) Notice: Subject to any disclaimer, the term of this patent is extended or adjusted under 35 U.S.C. 154(b) by 0 days.

(21) Appl. No.: 17/473,045

(22) Filed: Sep. 13, 2021

(65) Prior Publication Data
US 2022/0131410 A1    Apr. 28, 2022

Related U.S. Application Data

(60) Provisional application No. 63/106,033, filed on Oct. 27, 2020.

(51) Int. Cl.
*H02J 50/00*    (2016.01)
*H02J 7/00*    (2006.01)
(Continued)

(52) U.S. Cl.
CPC ......... *H02J 50/001* (2020.01); *H02J 7/00711* (2020.01); *H02J 7/02* (2013.01);
(Continued)

(58) Field of Classification Search
CPC ........ B60L 5/005; B60L 53/12; B60L 53/122; B60L 53/124; B60L 53/126;
(Continued)

(56) References Cited

U.S. PATENT DOCUMENTS 8,639,339 B2    1/2014  Bange et al.
9,232,475 B2    1/2016  Heinzelman et al.
(Continued)

FOREIGN PATENT DOCUMENTS

EP    3636495 A1    4/2020

OTHER PUBLICATIONS

International Search Report and Written Opinion issued in corresponding application, PCT/US2021/050089, dated Feb. 1, 2022, 11 pages.

(Continued)

*Primary Examiner* — Quan Tra
(74) *Attorney, Agent, or Firm* — J. Peter Paredes; Amin Talati Wasserman LLP

(57) ABSTRACT

A multi-power-mode ultra-low-power address detector for Radio Frequency (RF) wakeup receivers is provided herein. The address detector is implemented when combined charging and wake-up of a device is required. The method includes a set of components to process a complex address waveform. This address includes a preamble composed of a pulse with a specific width, followed by a digital Pulse Width Modulation (PWM) modulated bit pattern.

3 Claims, 11 Drawing Sheets

(51) Int. Cl.
  *H02J 50/20* (2016.01)
  *H02J 7/02* (2016.01)
  *H04W 52/02* (2009.01)
  *H02J 50/40* (2016.01)
  *H02J 7/34* (2006.01)

(52) U.S. Cl.
  CPC ............ *H02J 50/20* (2016.02); *H02J 50/402* (2020.01); *H04W 52/0274* (2013.01); *H02J 7/345* (2013.01)

(58) Field of Classification Search
  CPC ......... H01F 27/006; H01F 38/14; H02G 7/16; H02J 5/00; H02J 5/005; H02J 7/00; H02J 7/0042; H02J 7/0044; H02J 7/0045; H02J 7/025; H02J 17/00; H02J 50/00; H02J 50/001; H02J 50/005
  USPC ......................................................... 307/104
  See application file for complete search history.

(56) References Cited

U.S. PATENT DOCUMENTS

| | | | |
|---|---|---|---|
| 9,245,158 B2 | 1/2016 | Gudan et al. | |
| 10,306,575 B2 | 5/2019 | Sorrentino et al. | |
| 10,340,700 B2 | 7/2019 | Frenila et al. | |
| 2011/0248570 A1* | 10/2011 | Hong | H01F 27/363 307/104 |
| 2012/0281547 A1* | 11/2012 | Kim | H02J 50/12 370/242 |
| 2013/0134927 A1* | 5/2013 | Park | H02J 50/40 307/104 |
| 2014/0346888 A1* | 11/2014 | Kim | H02J 50/12 307/104 |
| 2015/0116127 A1 | 4/2015 | Lynch et al. | |
| 2016/0254844 A1 | 9/2016 | Hull et al. | |

OTHER PUBLICATIONS

Akan, O. B., et al. "Internet of Hybrid Energy Harvesting Things" IEEE Internet of Things Journal, vol. 5, No. 2, (Apr. 2018): pp. 736-746.

Benbuk, A. A., et al. "A Nano-Watt Dual-Mode Address Detector for a Wi-Fi Enabled RF Wake-up Receiver" 2019 IEEE Sensors. IEEE, 2019, 4 pages.

Benbuk, A. A., et al. "Leveraging UAVs for Passive RF Charging and Ultralowpower Wake-Up of Ground Sensors." IEEE Sensors Letters vol. 4 No. 5 (May 2020): pp. 1-4.

Khodr, H., et al. "Energy Efficient IoT Sensor With RF Wake-Up and Addressing Capability" IEEE Sensors Letters vol. 1 No. 6 (Dec. 2017): pp. 1-4.

Oller, J., et al. "Has Time Come to Switch From Duty-Cycled MAC Protocols to Wake-Up Radio for Wireless Sensor Networks?" IEEE/ACM Transactions on Networking, vol. 24 No. 2 (Apr. 2016): pp. 674-687.

Piyare, R., et al. "Ultra Low Power Wake-Up Radios: A Hardware and Networking Survey" IEEE Communications Surveys & Tutorials, vol. 19 No. 4 (2017): pp. 2117-2157.

* cited by examiner

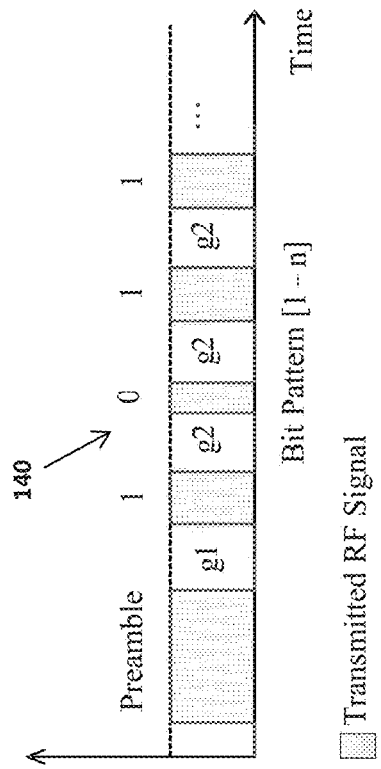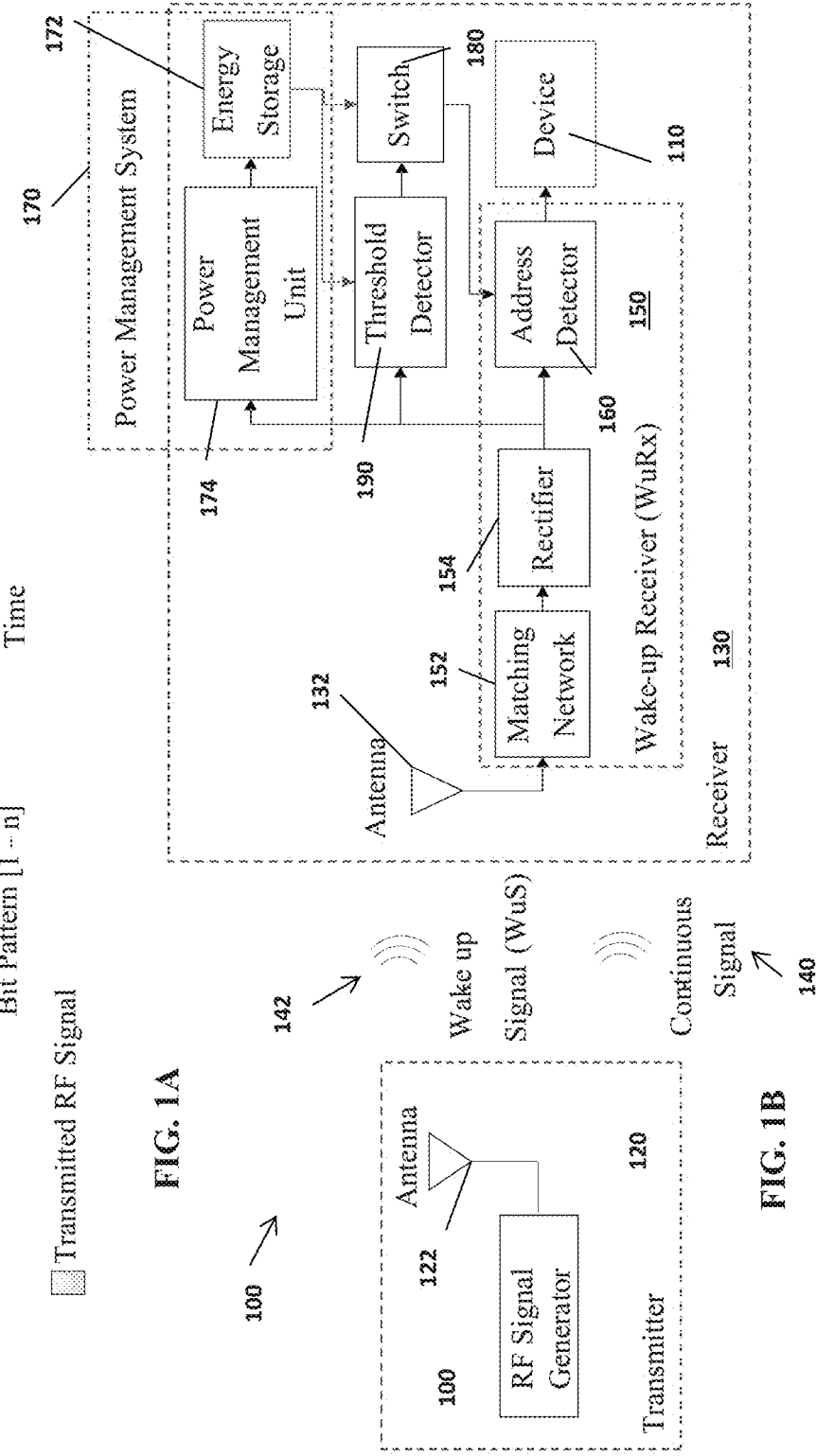
FIG. 1A
FIG. 1B

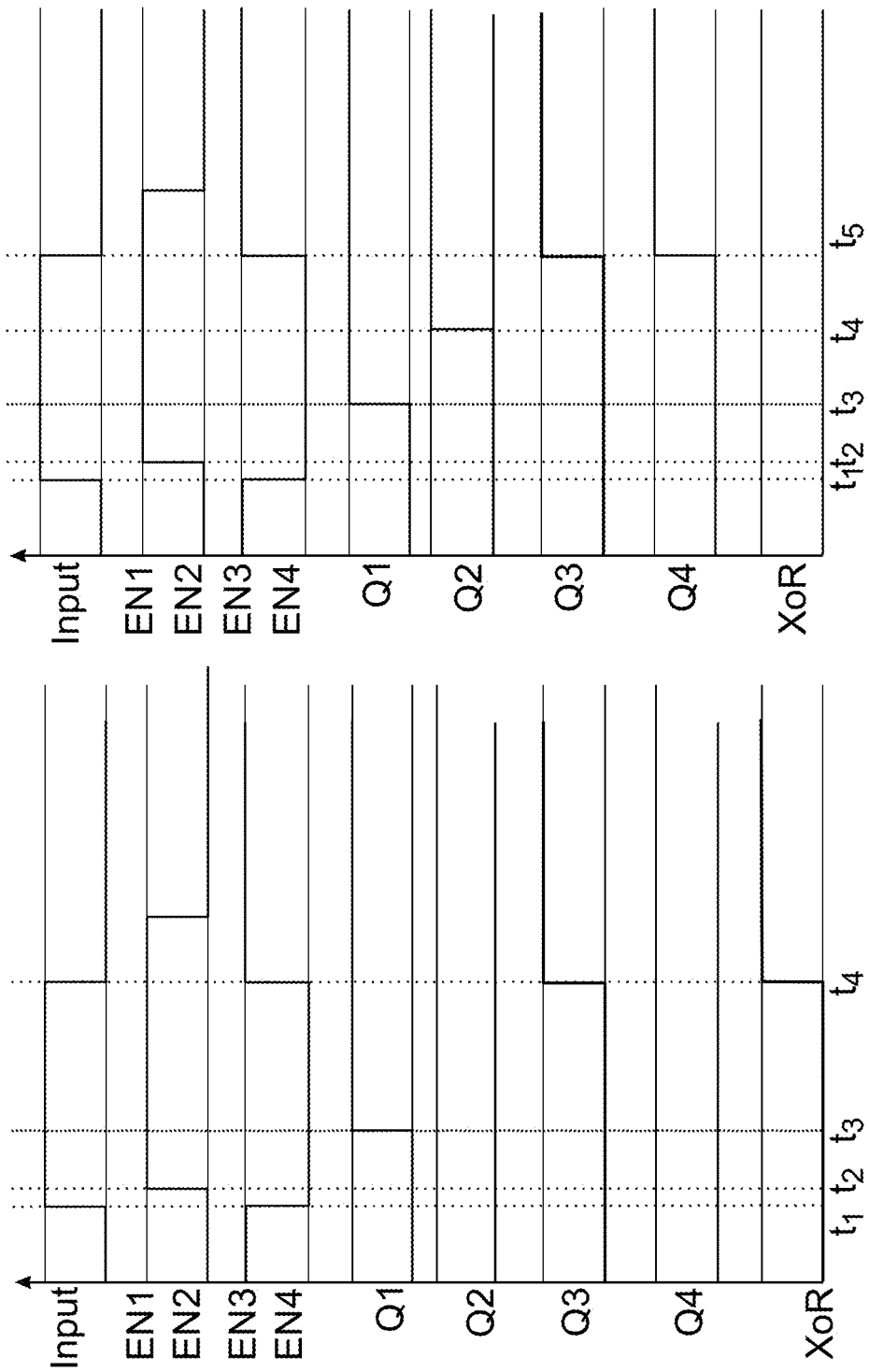

ULTRA-LOW-POWER MULTI-POWER-MODE ADDRESS DETECTOR FOR COMBINED RF CHARGING AND WAKE-UP AND METHODS OF USE

CROSS-REFERENCE TO RELATED APPLICATIONS

The present applications claims priority from U.S. Provisional Application Ser. No. 63/106,033, filed Oct. 27, 2020, which is incorporated by reference herein in its entirety.

BACKGROUND

The invention generally relates to electronic devices and more particularly to wireless charging.

Ultra-low power wake-up receivers have become an essential part of Internet of Things (IoT) devices that rely on a limited source of power to operate [1]. In contrast to scheduled operation, wake-up receivers allow these devices to spend most of the time in sleep mode, and switch to active mode only when they are required to function [2]. Wake-up receivers rely on ultra-low-power address detectors comprising a simple architecture to reduce their power consumption [3] [4]. Furthermore, integrating wake-up and energy harvesting capabilities maximizes energy savings by relying on ambient energy sources and minimizing energy waste [5] [6].

Many techniques have been developed in the last several years to achieve wake-up of IoT devices. One technique in U.S. Pat. No. 8,639,339B2 [7] reduces the power consumption of a medical implant by relying on scheduled wake-ups. The external transmitter transmits a predetermined signal to communicate with the implant. The implant is activated periodically to transmit and receive data and contains a microprocessor to achieve this function. In addition, inductive coupling is implemented between the transmitter and receiver to transfer power to the implanted device from a short distance. Inductive coupling allows harvesting at very small distances which limits the applications of this approach. In addition, scheduled wake-ups lead to excessive energy waste through idle listening.

An alternative approach is presented in U.S. Pat. No. 9,245,158B2 [8] where a dual-band RF energy harvester and wake-up receiver is presented. The system harvests RF energy at a frequency of 2.4 GHz and includes a passive address detector operating at 5.8 GHz. The passive detector demodulates the wake-up signal by comparing received power levels from the external interrogator. Furthermore, the system implements backscattering to transmit signals to the interrogator. The backscattering modulator is implemented in a microprocessor that modulates the impedance matching of the system's antenna and it is powered by the energy harvested at 2.4 GHz. Two antennas and matching networks are required for harvesting and wake-up operations.

To reduce the complexity of this approach, we propose an in-band system that uses the same antenna for both wake-up and harvesting. The transmitter and receiver can switch between these two tasks, while minimizing the power consumption of the receiver.

A fully-passive, range-based RF wake-up receiver operating at UHF frequency band of 860 to 960 MHz is presented in U.S. Pat. No. 9,232,475B2 [9]. The solution implements a single antenna and a voltage multiplier circuit to harvest energy from the wake-up signal. The harvested voltage is used to power an ultra-low power comparator that generates a trigger to a device. This approach combines harvesting and wake-up operations at a single frequency and eliminates the need for multiple antennas. However, the wake-up mechanism lacks the ability to target a specific device by encoding an address in the wake-up signal.

The present invention attempts to solve these problems, as well as others.

SUMMARY OF THE INVENTION

Provided herein are systems, methods and apparatuses for an Ultra-Low-Power Multi-Power-Mode Address Detector for Combined RF Charging and Wake-up. Disclosed herein is RF energy harvesting methods to extend the harvesting and wake-up range. In one embodiment, a complex addressing scheme selectively powers the device when required and avoids unnecessary wake-ups.

The methods, systems, and apparatuses are set forth in part in the description which follows, and in part will be obvious from the description, or can be learned by practice of the methods, apparatuses, and systems. The advantages of the methods, apparatuses, and systems will be realized and attained by means of the elements and combinations particularly pointed out in the appended claims. It is to be understood that both the foregoing general description and the following detailed description are exemplary and explanatory only and are not restrictive of the methods, apparatuses, and systems, as claimed.

Accordingly, it is an object of the invention not to encompass within the invention any previously known product, process of making the product, or method of using the product such that Applicants reserve the right and hereby disclose a disclaimer of any previously known product, process, or method. It is further noted that the invention does not intend to encompass within the scope of the invention any product, process, or making of the product or method of using the product, which does not meet the written description and enablement requirements of the USPTO (35 U.S.C. § 112, first paragraph) or the EPO (Article 83 of the EPC), such that Applicants reserve the right and hereby disclose a disclaimer of any previously described product, process of making the product, or method of using the product. It may be advantageous in the practice of the invention to be in compliance with Art. 53(c) EPC and Rule 28(b) and (c) EPC. All rights to explicitly disclaim any embodiments that are the subject of any granted patent(s) of applicant in the lineage of this application or in any other lineage or in any prior filed application of any third party is explicitly reserved. Nothing herein is to be construed as a promise.

BRIEF DESCRIPTION OF THE DRAWINGS

In the accompanying figures, like elements are identified by like reference numerals among the several preferred embodiments of the present invention.

FIG. 1A is a schematic of the Wake-up Signal Architecture, according to one embodiment; and FIG. 1B is a schematic of the Wireless System Block Diagram, according to one embodiment.

FIG. 4A is a graph of the Pulse Width Detector Output for when the Preamble Width is matched; and FIG. 4B is a graph of the Pulse Width Detector Output for when the Preamble Width is not matched.

DETAILED DESCRIPTION OF THE INVENTION

Figure 2:
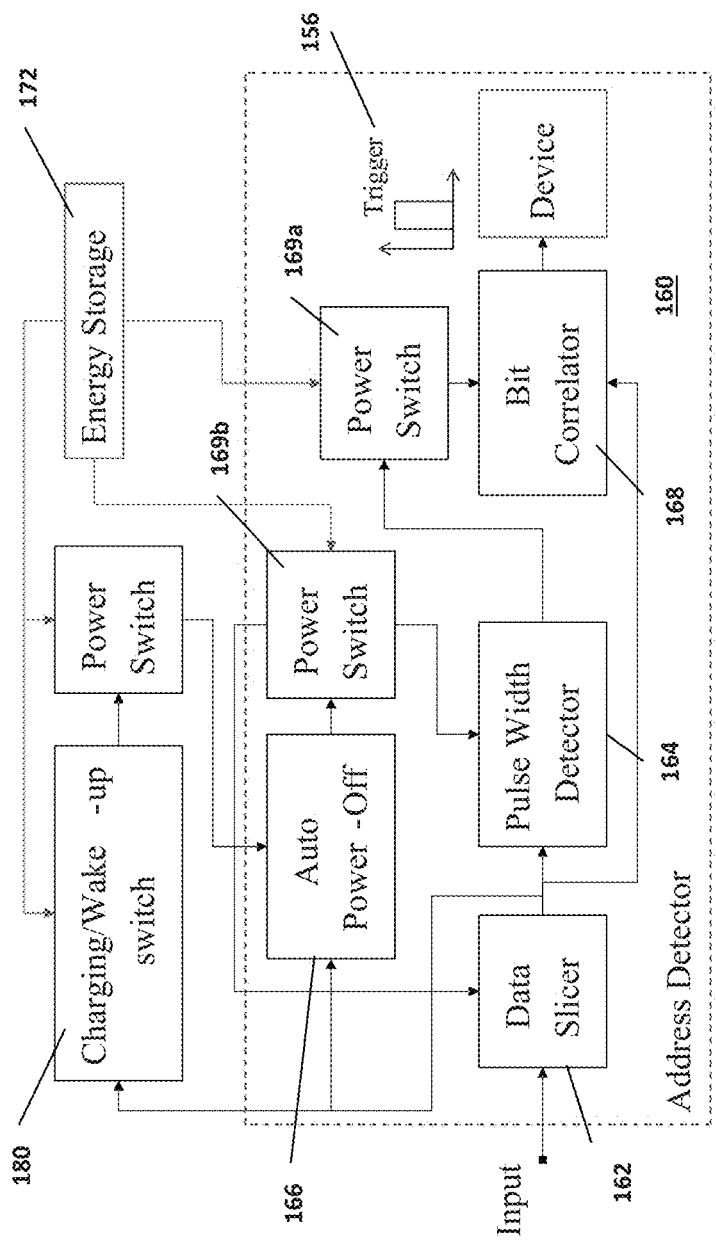
FIG. 2 is a schematic of the Address Detector Block Diagram, according to one embodiment.

The foregoing and other features and advantages of the invention are apparent from the following detailed description of exemplary embodiments, read in conjunction with the accompanying drawings. The detailed description and drawings are merely illustrative of the invention rather than limiting, the scope of the invention being defined by the appended claims and equivalents thereof.

Embodiments of the invention will now be described with reference to the Figures, wherein like numerals reflect like elements throughout. The terminology used in the description presented herein is not intended to be interpreted in any limited or restrictive way, simply because it is being utilized in conjunction with detailed description of certain specific embodiments of the invention. Furthermore, embodiments of the invention may include several novel features, no single one of which is solely responsible for its desirable attributes or which is essential to practicing the invention described herein.

The use of the terms "a" and "an" and "the" and similar referents in the context of describing the invention are to be construed to cover both the singular and the plural, unless otherwise indicated herein or clearly contradicted by context. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Recitation of ranges of values herein are merely intended to serve as a shorthand method of referring individually to each separate value falling within the range, unless otherwise indicated herein, and each separate value is incorporated into the specification as if it were individually recited herein. The word "about," when accompanying a numerical value, is to be construed as indicating a deviation of up to and inclusive of 10% from the stated numerical value. The use of any and all examples, or exemplary language ("e.g." or "such as") provided herein, is intended merely to better illuminate the invention and does not pose a limitation on the scope of the invention unless otherwise claimed. No language in the specification should be construed as indicating any nonclaimed element as essential to the practice of the invention.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

A multi-power-mode ultra-low-power address detector for Radio Frequency (RF) wakeup receivers is disclosed herein. The address detector is implemented when combined charging and wake-up of an electronic device is required. The method comprises a plurality of components to process a complex address waveform, as shown in FIG. 1A. The address waveform comprises a preamble composed of a pulse with a specific width, followed by a digital Pulse Width Modulation (PWM) modulated bit pattern.

The electronic device may be any electrical device that requires continuous electrical energy or that requires power from a battery. Non-limiting examples of electrical devices may include IoT devices, laptops, mobile phones, smartphones, tablets, music players, toys, batteries, flashlights, lamps, electronic watches, cameras, gaming consoles, appliances, GPS devices, and wearable devices or so-called "wearables" (e.g., fitness bracelets, pedometers, smartwatch), among other types of electrical devices.

The detector switches between multiple power consumption states to process the received address. When the address is matched, the detector generates a trigger that wakes up a device from sleep mode to active mode. At the lowest power consumption state, the detector operates at the order of nanowatts to listen to the medium. When an address is received, the detector switches to higher power consumption modes, in the microwatt range, to process the signal.

The detector is designed to be implemented at the output of an RF rectifier that can be used for both charging and demodulating a wake-up signal. Therefore, it contains a function to hibernate when a charging signal is detected at the output of the rectifier. When the external transmitter stops charging the system's battery, the detector returns to the listening state to detect the wake-up signal.

The circuit can be tuned to detect a different address without introducing drastic changes to the architecture. Therefore, tuning can be performed easily through a low cost and scalable design that can be implemented in a variety of applications where it is critical to reduce the system's power consumption.

As shown in FIG. 1B, the wireless communication system 100 comprises a transmitter 120 and a receiver 130; the transmitter generates a continuous signal 140 at a frequency ($f_0$) and a Wake-up Signal (WuS) 142 that is received by the receiver connected to an electronic device 110; the continuous signal 140 generated by the transmitter does not wake-up the electronic device and the electronic device 110 avoids wake-ups when the continuous signal 140 is received by the receiver 130; the continuous signal 140 generated by the transmitter charges the energy storage (172) at the receiver, while the transmitter transmits a modulated wake-up signal 142 to wake-up the device (110) at the receiver and the transmitter 120 is a wake-up transmitter (WuTx) and the receiver 130 is a wake-up receiver 150 (WuRx). The transmitter 120 further includes an antenna 122 operating at a center frequency ($f_0$) and the receiver 130 includes an antenna 132 operating at a center frequency ($f_0$).

Transmitters 120 may transmit power transmission signals comprising power transmission waves, which may be captured by receivers 130. The receivers 130 may comprise antennas, antenna elements, and other circuitry (detailed later), which may convert the captured waves into a useable source of electrical energy on behalf of electronic devices associated with the receivers 130. In some embodiments, transmitters 120 may transmit power transmission signals, made up of power transmission waves, in one or more trajectories by manipulating the phase, gain, and/or other waveform features of the power transmission waves, and/or by selecting different transmit antennas. In such embodiments, the transmitters 120 may manipulate the trajectories of the power transmission signals so that the underlying power transmission waves converge at a location in space, resulting in certain forms of interference. In some cases, one or more transmitters 120 may transmit a plurality of power transmission signals that are propagated in a multiple directions and may deflect off of physical obstructions (e.g., walls). The plurality of power transmission signals may converge at a location in a three-dimensional space. Receivers 120 within the boundaries of a signal convergence may capture and covert the power transmission signals into a useable source of energy.

The transmitter 120 performs two functions: 1) operating as a wake-up transmitter (WuTx) by transmitting a wake-up signal 142 (WuS) to trigger the electronic device 110 from a sleep mode to an active mode; and transmitting a continuous signal 140 at $f_0$ to charge an energy storage element at the receiver, where the energy storage element is selected from the group consisting of: a battery, supercapacitor, and any other rechargeable direct-current (DC) voltage source.

Although the exemplary embodiment recites the use of RF wave transmission techniques, the wireless charging techniques should not be limited to RF wave transmission techniques. Rather, it should be appreciated that possible wireless charging techniques may include any number of alternative or additional techniques for transmitting energy to a receiver converting the transmitted energy to electrical power. Non-limiting exemplary transmission techniques for energy that can be converted by a receiving device into electrical power may include: ultrasound, microwave, resonant and inductive magnetic fields, laser light, infrared, or other forms of electromagnetic energy. In the case of ultrasound, for example, one or more transducer elements may be disposed so as to form a transducer array that transmits ultrasound waves toward a receiving device that receives the ultrasound waves and converts them to electrical power. In the case of resonant or inductive magnetic fields, magnetic fields are created in a transmitter coil and converted by a receiver coil into electrical power. In addition, although the exemplary transmitter 120 is shown as a single unit comprising potentially multiple transmitters (transmit array), both for RF transmission of power and for other power transmission methods mentioned in this paragraph, the transmit arrays can comprise multiple transmitters that are physically spread around a room rather than being in a compact regular structure.

The receiver 130 may comprise circuitry that then converts the energy of the power transmission signals (e.g., the radio frequency electromagnetic radiation) to electrical energy. A rectifier of the receiver 130 may translate the electrical energy from AC to DC. Other types of conditioning may be applied, as well. For example, a voltage conditioning circuit may increase or decrease the voltage of the electrical energy as required by the device. An electrical relay may then convey the electrical energy from the receiver 130 to the device. In some embodiments, the receiver 130 may comprise a communications component that transmits control signals to the transmitter 120 in order to exchange data in real-time or near real-time. The control signals may contain status information about the device, the receiver 130, or the power transmission signals. Status information may include, for example, present location information of the device, amount of charge received, amount of charged used, and user account information, among other types of information. Further, in some applications, the receiver 130 including the rectifier that it contains may be integrated into the device. Control signals may be RF waves or any other communication medium or protocol capable of communicating data between processors, such as Bluetooth®, RFID, infrared, near-field communication (NFC).

As shown in FIG. 1A, the WuS architecture includes a sequence of bursts of a wireless signal to instruct a wake-up receiver 150 (WuRx) to trigger the electronic device 110 from the sleep mode to the active mode, wherein the WuS 142 comprises: a preamble composed of a signal burst at $f_0$ that lasts for a specific period ($t_{preamble}$); the preamble is followed by silence with a period of guard time g1; a bit pattern includes a plurality of bursts at a frequency of $f_0$ with at least two possible periods representing a 1-bit or a 0-bit; the plurality of bursts are separated by silence with a period of guard time g2; and $f_0$ includes any value within the UHF, microwave, or millimeter wave ranges of the spectrum.

The WuRx 150 decodes the WuS 142 and generates a trigger signal 156 to the electronic device 110. The WuRx 150 comprises a matching network 152, a rectifier 154, and an address detector 160. The matching network 152 maximizes the power delivery between the antenna and a WuRx circuit. The rectifier 154 that converts the received wireless signal at $f_0$ to DC voltage. As shown in FIG. 2, the address detector 160 comprises a data slicer 162, a pulse width detector (PWD) 164, an auto power-off timer 166, a bit correlator 168, a plurality of digitally controlled power switches 169. The data slicer 162 converts the input DC voltage into a plurality of digital pulses. The pulse width detector 164 (PWD) generates a digital signal edge when a digital signal edge lasting for a specific period is applied to an input. The auto power-off timer 166 generates the digital signal edge for a specific period after a digital signal edge is applied to its input. The bit correlator 168 demodulates the plurality of input pulses into a 0- or 1-bit based their period and stores the demodulated input pulse values in a memory, and the bit correlator generates a digital signal edge only when a specific bit pattern is received. The plurality of digitally controlled power switches 169a, 169b control the power delivery from an energy source to the active components of the address detector 160.

As shown in FIG. 1B, the receiver 130 further comprises an energy management and storage system 170 implemented at the receiver 130 and comprising a power management unit (PMU) 174 and an energy storage element 172. The power management unit 174 maximizes a power transfer between the rectifier and the energy storage element 172. The energy storage element 172 is operably coupled with a charging/wake-up switch 180. The charging/wake-up switch 180 is implemented at the receiver 130 to switch between charging and wake-up operations. The energy storage element 172 is operably coupled with a threshold detector 190 that monitors the period of a continuous digital signal edge applied to its input. As shown in FIG. 2, the energy storage element 172 is operably coupled with the digitally controlled power switches 169a, 169b to control the power delivery from the energy source to the active components of the address detector.

Detailed Operation

In operation, an input RF signal with a frequency of $f_0$ is received by the antenna 132 and converted into DC voltage by the rectifier 154. The data slicer 162 converts the output of the rectifier 154 into digital pulses. As shown in FIG. 2, the input of the address detector 160 is connected to the output of the rectifier 154. The address detector 160 remains in the listening state when no output is received. When the preamble is received, the auto power-off timer 166 connects power to a pulse width detector (PWD) 164 to process the width of the pulse and the detector 160 moves to the processing preamble state.

If the pulse width is not matched, the auto power-off timer 166 disconnects power from the pulse width detector 164 and the address detector 160 returns to the listening state. In the processing bit sequence state, the bit correlator 168 examines the bit sequence to determine if it matches the tuned sequence. When the bit sequence is matched, the bit correlator 168 generates a trigger signal 156. When the transmitter 120 is charging the energy storage 172, the charging/wake-up switch 180, realized in a threshold detector 190, charges above its configured threshold.

Figure 3:
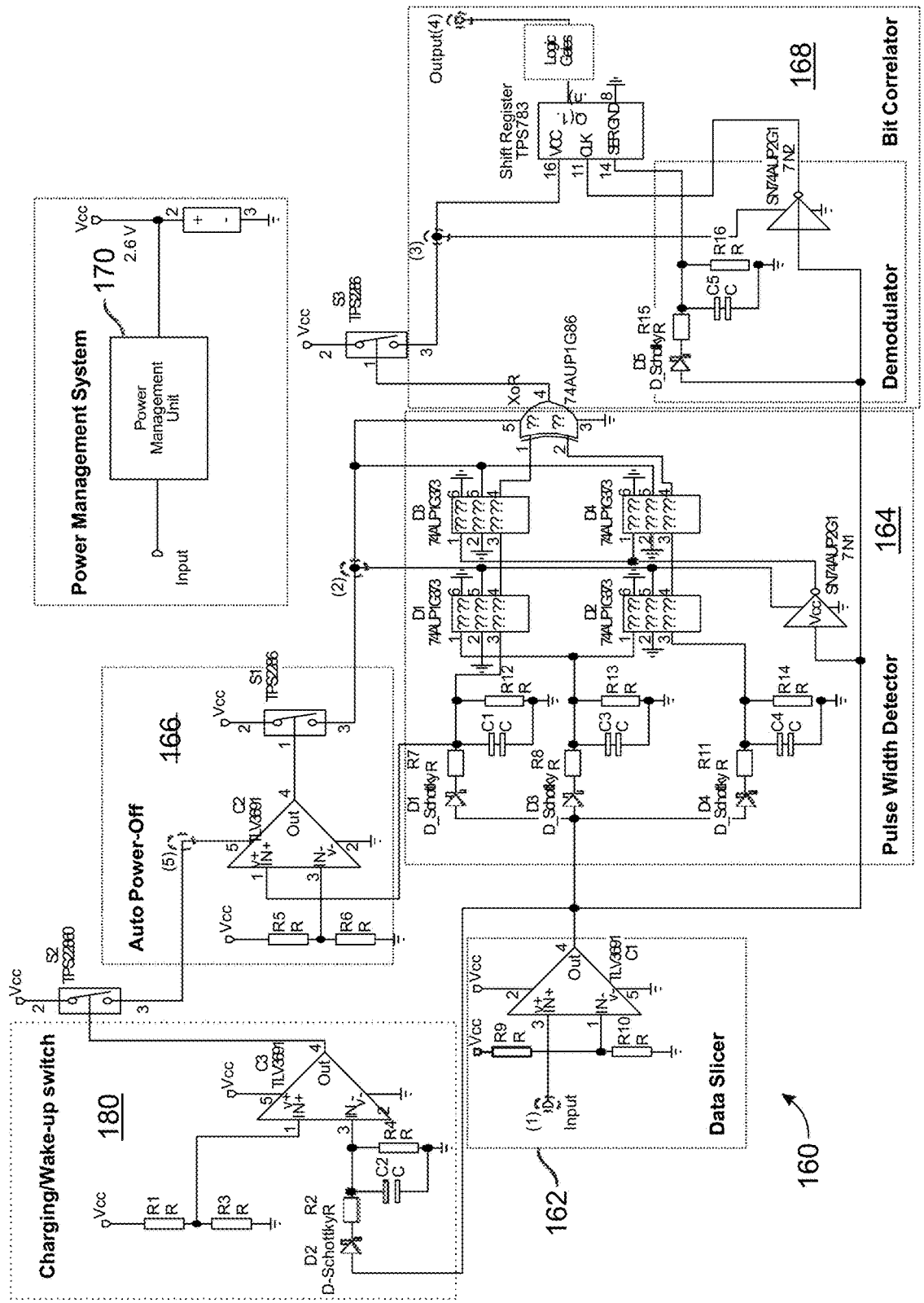
FIG. 3 is a schematic of the Receiver Circuit, according to one embodiment.

The threshold detector 190 disconnects power from the auto power-off timer 166 when the threshold is exceeded, effectively disconnecting power from the rest of the address detector 160. Therefore, the detector 160 moves into the charging state. The threshold detector 160 connects power to the auto power off timer 166 after the charging signal is removed, and the detector 160 returns to the listening state FIG. 3 shows the circuit diagram of the detector 160. The data slicer 162 is a comparator with the input connected to the output of the rectifier. The data slicer 162 is configured with a threshold using the voltage divider of R9 and R7, according to one embodiment. The sensitivity of the address detector 160 can be increased by reducing the threshold of the data slicer 162, according to other embodiments.

When a preamble is received, as shown in FIGS. 4A-4B, t1, the data slicer 162 output charges the R7C1 circuit of the Pulse Width Detector 164. The voltage at the R7C1 circuit is connected to the positive input of the auto-power off timer 166. When this voltage exceeds the threshold of the auto power-off timer 166, it generates a high edge and the power is connected to the active components of the pulse width detector circuit 164. The detector 160 moves to processing preamble state.

As shown in FIG. 3, the voltage values stored on R7C1 and R11C4 determines the tuned width of the PWD 164. The values of the resistors are configured such that R7C1<R11C4, according to one embodiment. When the tuned pulse width is received, the voltage at R7C1 exceeds the threshold of D-latch D1 of the PWD 164 and the voltage at R11C4 remains below the threshold of D-latch D2 of the PWD. D-latches D3 and D4 of the PWD 164 are only enabled if the voltage on at R8C3 exceeds the threshold (t2).

Inverter N1 on the PWD 164 delivers the values stored in D-latches D3 and D4 to the XoR gate when the preamble is removed (t4) (at the start of g1). Only when the correct preamble is received, the bit correlator 168 is enabled, and the detector 160 moves to the processing bit sequence state.

In the processing bit sequence state, the bit correlator 168 processes the width of the 1- and 0-bits and their values are stored in parallel in a shift register. The bit correlator 168 contains a demodulator implemented in the R15C5 circuit and inverter N2. The clock of the shift register is configured to push the voltage value recorded on R7C1 after the bit is removed, at the start of g2.

When a 0-bit is received the R15C5 voltage remains below the threshold of the shift register serial port. The voltage exceeds the threshold when a 1-bit is received. Logic gates are connected at the output of the shift register to generate a trigger when the bit sequence is matched Upon charging, the voltage on R2C2 exceeds the threshold of the charging/wake-up switch configured on the negative input of comparator C3. The switch is connected to a threshold detector with a negative logic, and it disconnects power from the auto power-off circuit when its threshold is exceeded.

The voltage of R2C2 decreases when the transmitter completes the charging task. The output of comparator C3 turns to a digital high edge, and the detector returns to the listening state.

Figure 5A:
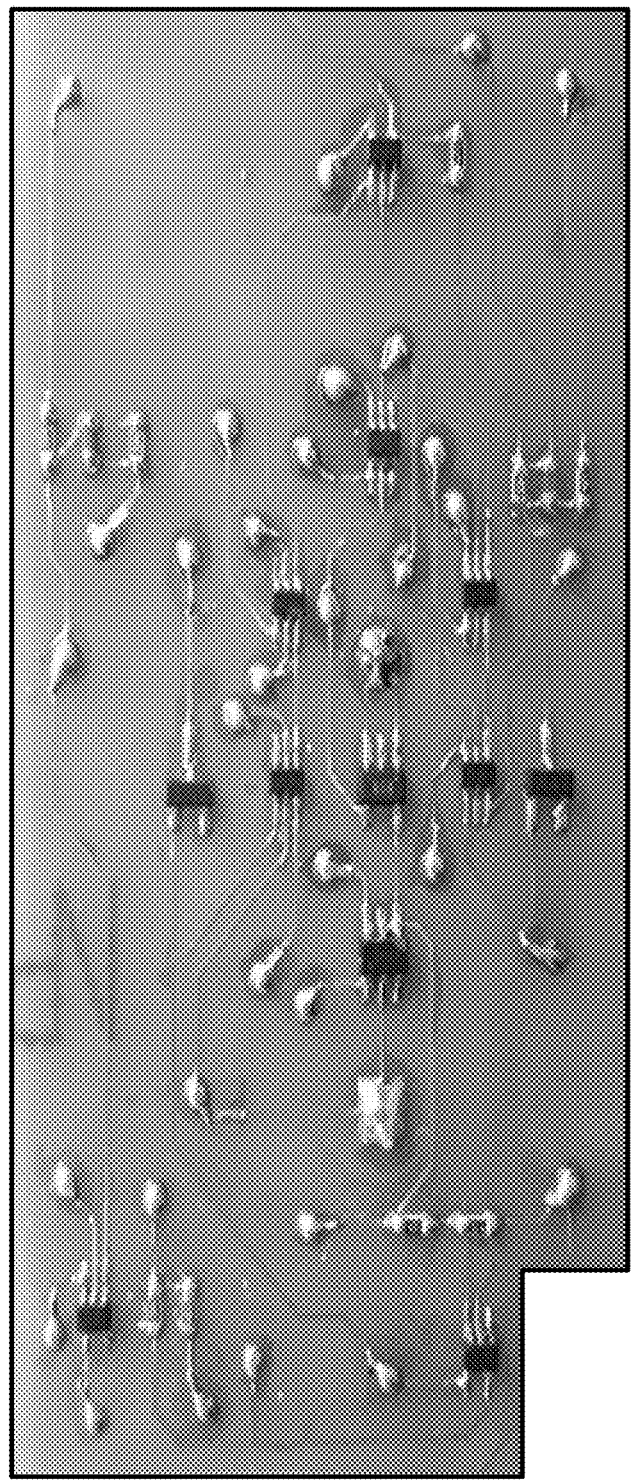
FIG. 5A is a top view of a photograph of the Pulse Width Detector, according to one embodiment.
Figure 5B:
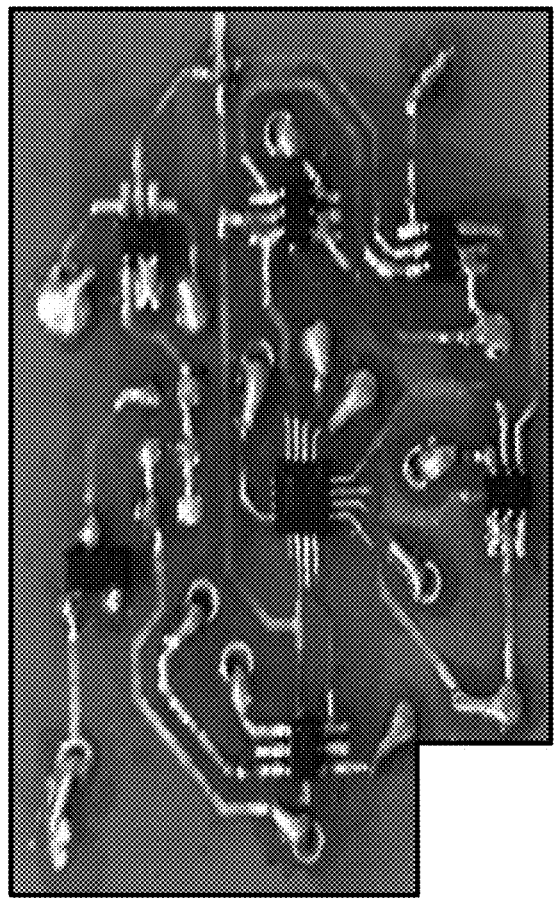
FIG. 5B is a top view of a photograph of the Bit Correlator.
Figure 5C:
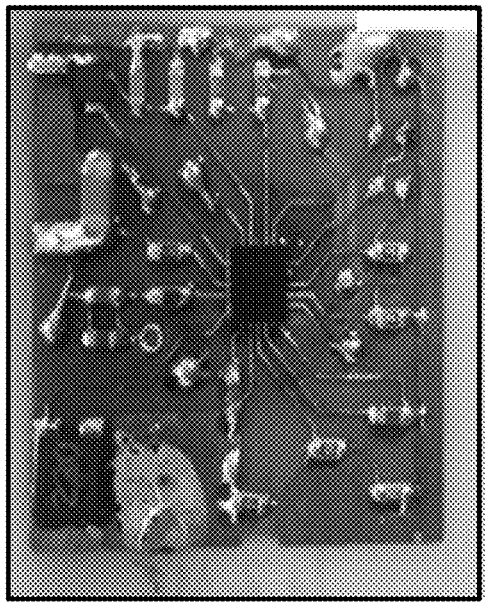
FIG. 5C is a top view of a photograph of the Power Management Unit.

FIG. 5A is a top view of a photograph of the Pulse Width Detector, according to one embodiment; FIG. 5B is a top view of a photograph of the Bit Correlator; and FIG. 5C is a top view of a photograph of the Power Management Unit.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention. However, those of skill in the art should, in light of the present disclosure, appreciate that many changes can be made in the specific embodiments which are disclosed and still obtain a like or similar result without departing from the spirit and scope of the invention.

Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Example #1: Detection of a Tuned Address

Figure 6A:
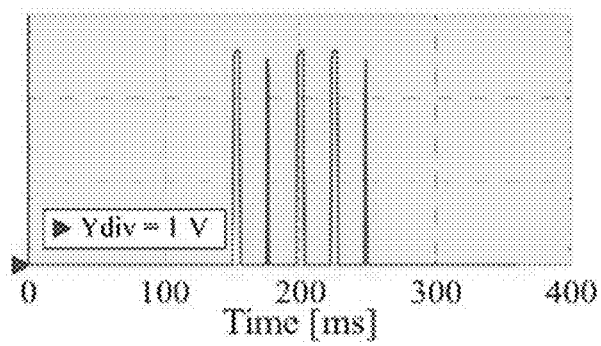
FIG. 6A is a graph showing an enlarged portion 6A of FIG. 6B with higher resolution in the time domain to observe the PWM modulation of 0- and 1-bits according to Example 1 embodiment.
Figure 6B:
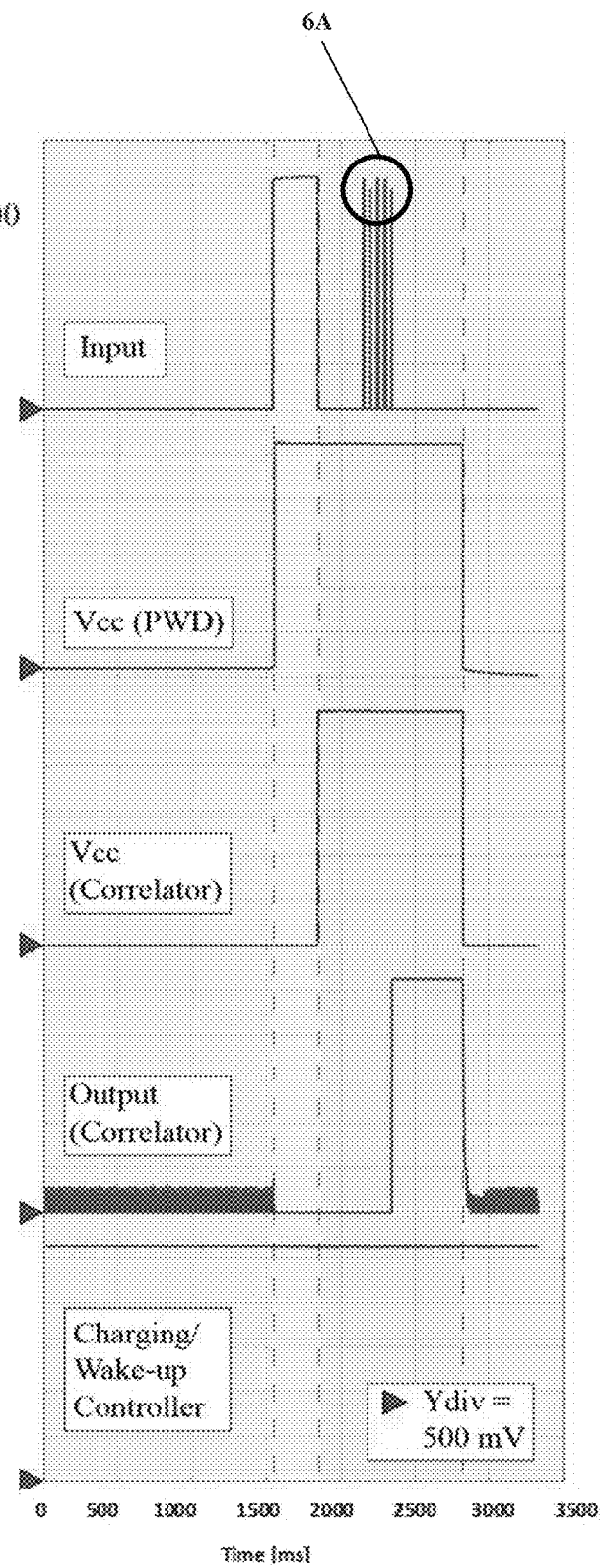
FIG. 6B is a graph of the input, the VCC (PWD), VCC (Correlator), the Output Correlator, and the Charging/Wake-up controller, according to one embodiment.

The detector starts from the listening state at about 225 nA as no input is received. When the preamble is received, the detector moves to the processing preamble state at +3 µA. The preamble matches the tuned preamble, and the detector moves to processing bit sequence at +10.5 µA. 5 After the bit sequence is matched, a trigger is generated. After the trigger is generated, the detector returns to the listening state, as shown in FIGS. 6A-6B.

TABLE I

WuS Values for Example #1

| Component | Value |
| --- | --- |
| Preamble | ~300 ms |
| g1 | ~300 ms |
| g2 | ~40 ms |
| 1-bit | ~10 ms |
| 0-bit | `3 ms |

Example #2: Shorter Preamble

Figure 7:
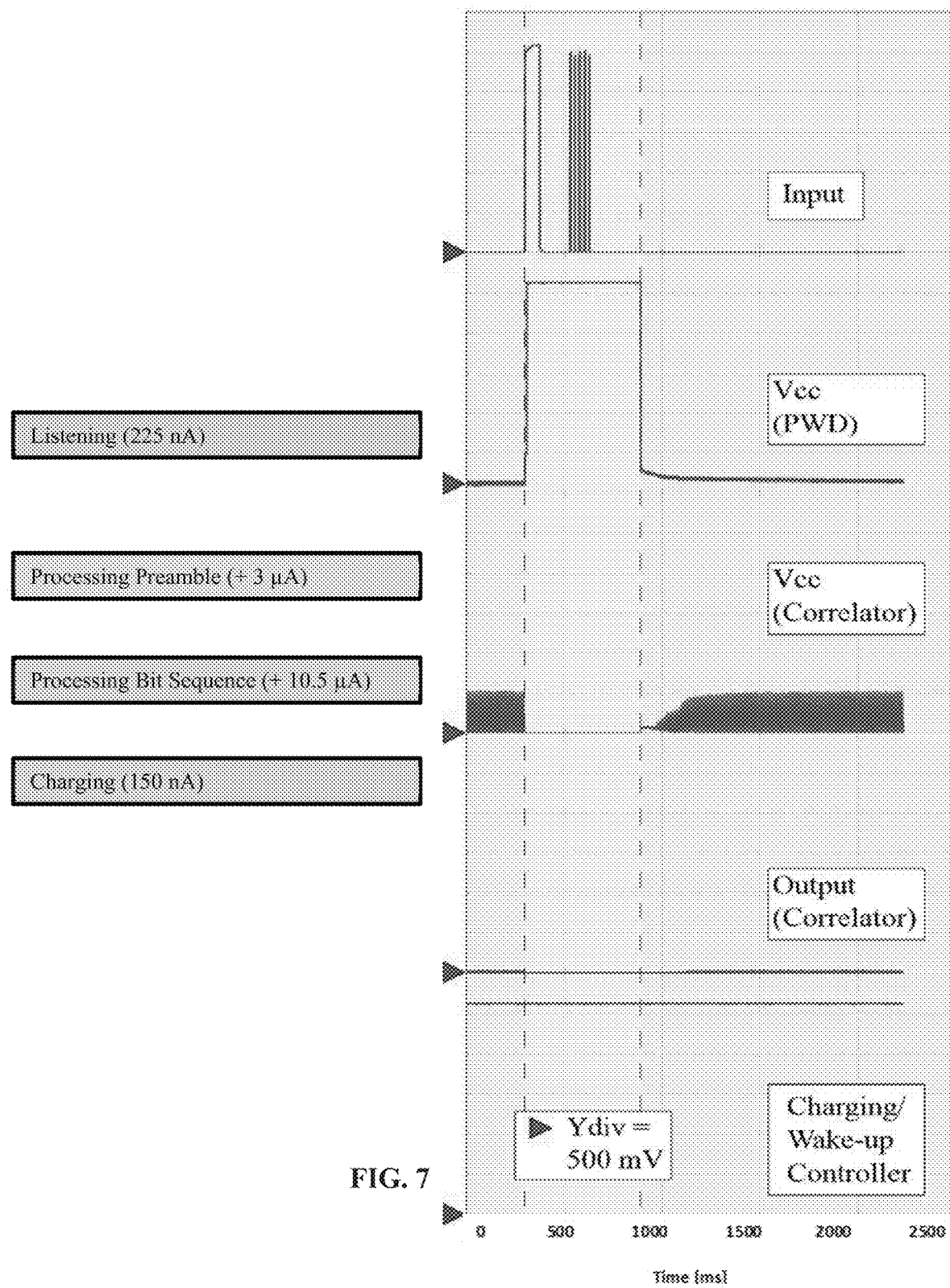
FIG. 7 is a graph of an address which begins with a shorter preamble followed by the correct bit pattern showing the input, the VCC (PWD), VCC (Correlator), the Output Correlator, and the Charging/Wake-up controller, according to one embodiment.

The detector moves to the processing preamble state at +3 µA to process the preamble but moves back to the listening state (about 225 nA) as the preamble is shorter than the tuned width, as shown in FIG. 7.

TABLE II

WuS Values for Example #2

| Component | Value |
| --- | --- |
| Preamble | ~100 ms |
| g1 | ~300 ms |
| g2 | ~40 ms |
| 1-bit | ~10 ms |
| 0-bit | ~3 ms |

Example #3: Larger Preamble

Figure 8:
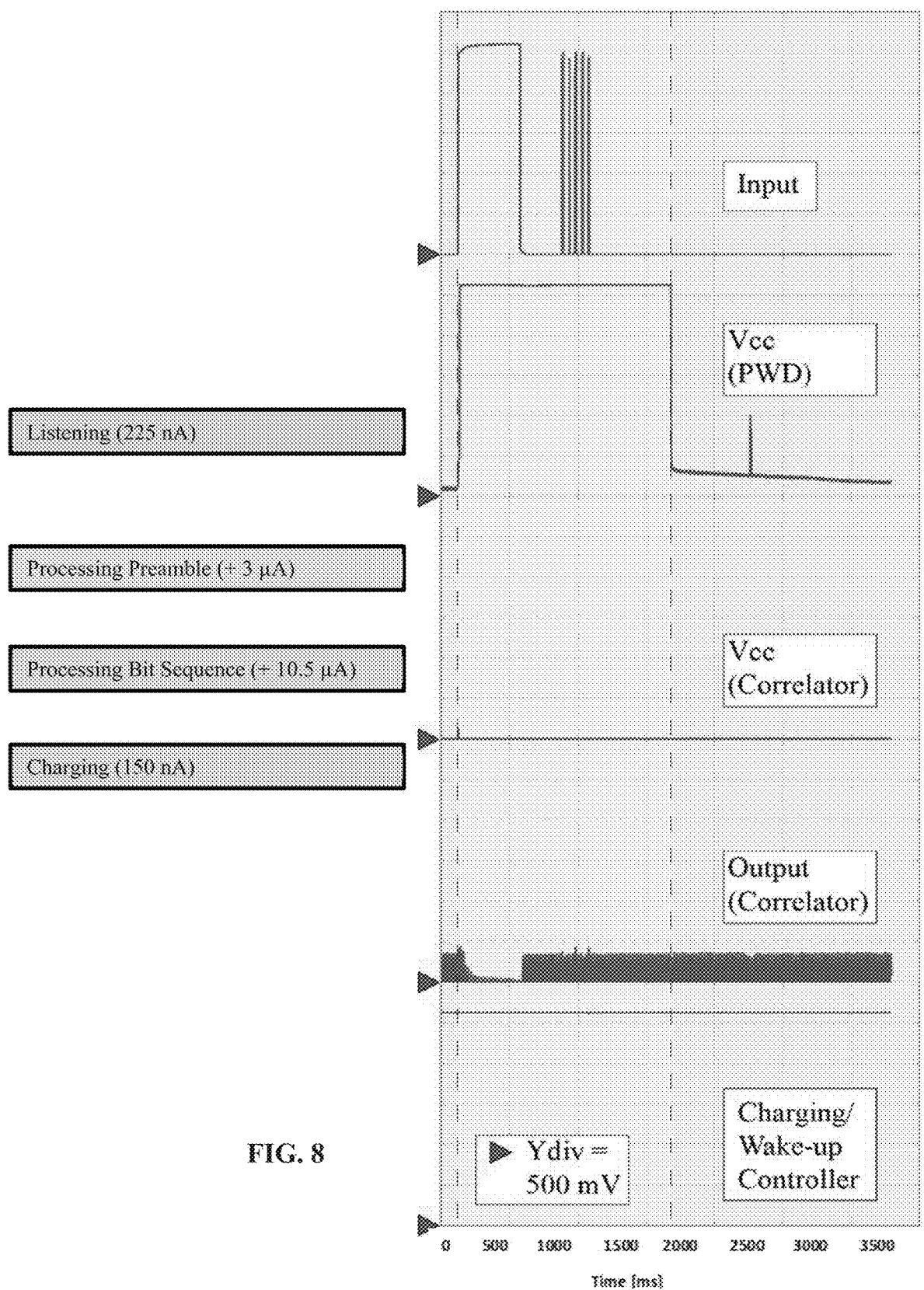
FIG. 8 is a graph of an address which begins with a larger preamble followed by the correct bit pattern showing the input, the VCC (PWD), VCC (Correlator), the Output Correlator, and the Charging/Wake-up controller, according to one embodiment.

The detector moves to the processing preamble state (+3 µA) to process the preamble but moves back to the listening state Listening (about 225 nA) as the preamble is larger than the tuned width, as shown in FIG. 8.

TABLE III

WuS Values for Example #3

| Component | Value |
| --- | --- |
| Preamble | ~400 ms |
| g1 | ~300 ms |
| g2 | ~40 ms |
| 1-bit | ~10 ms |
| 0-bit | ~3 ms |

Example #4: Wrong Bit

Figure 9A:
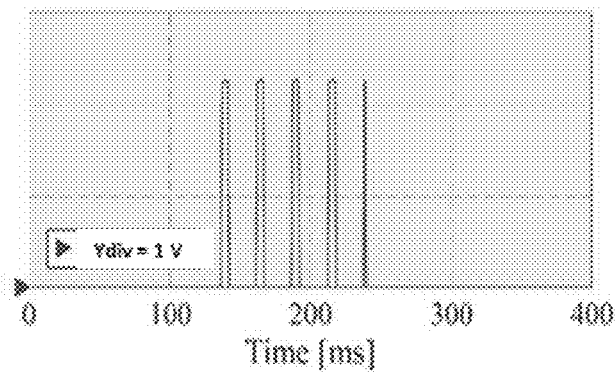
FIG. 9A is a graph of the bit pattern enlarged from portion 9A as shown in FIG. 9B with higher resolution in the time domain to observe the PWM modulation of 0- and 1-bits according to Example 4 embodiment.
Figure 9B:
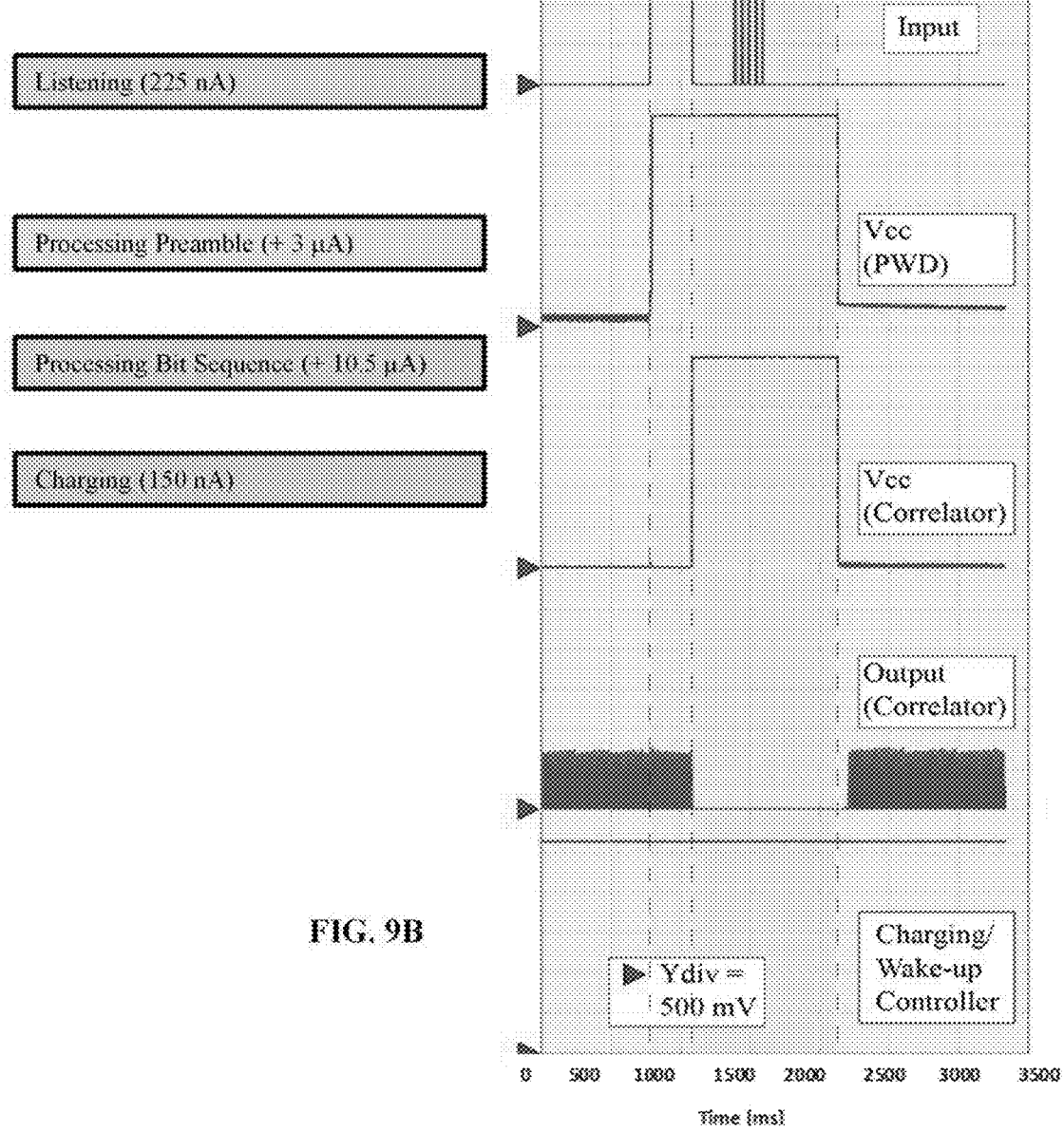
FIG. 9B is a graph of the input, the VCC (PWD), VCC (Correlator), the Output Correlator, and the Charging/Wake-up controller, according to one embodiment.

The detector starts from the listening state (about 225 nA) as no input is received. When the preamble (+3 µA) is received, the detector moves to the processing preamble state. The preamble matches the tuned preamble and the detector moves to processing bit sequence (+10.5 µA). The bit sequence is not matched, and the detector returns to the listening state, as shown in FIGS. 9A-9B.

TABLE IV

WuS Values for Example #4

| Component | Value |
| --- | --- |
| Preamble | ~100 ms |
| g1 | ~300 ms |
| g2 | ~40 ms |
| 1-bit | ~10 ms |
| 0-bit | ~10 ms |

Example #5: Charging Signal

Figure 10:
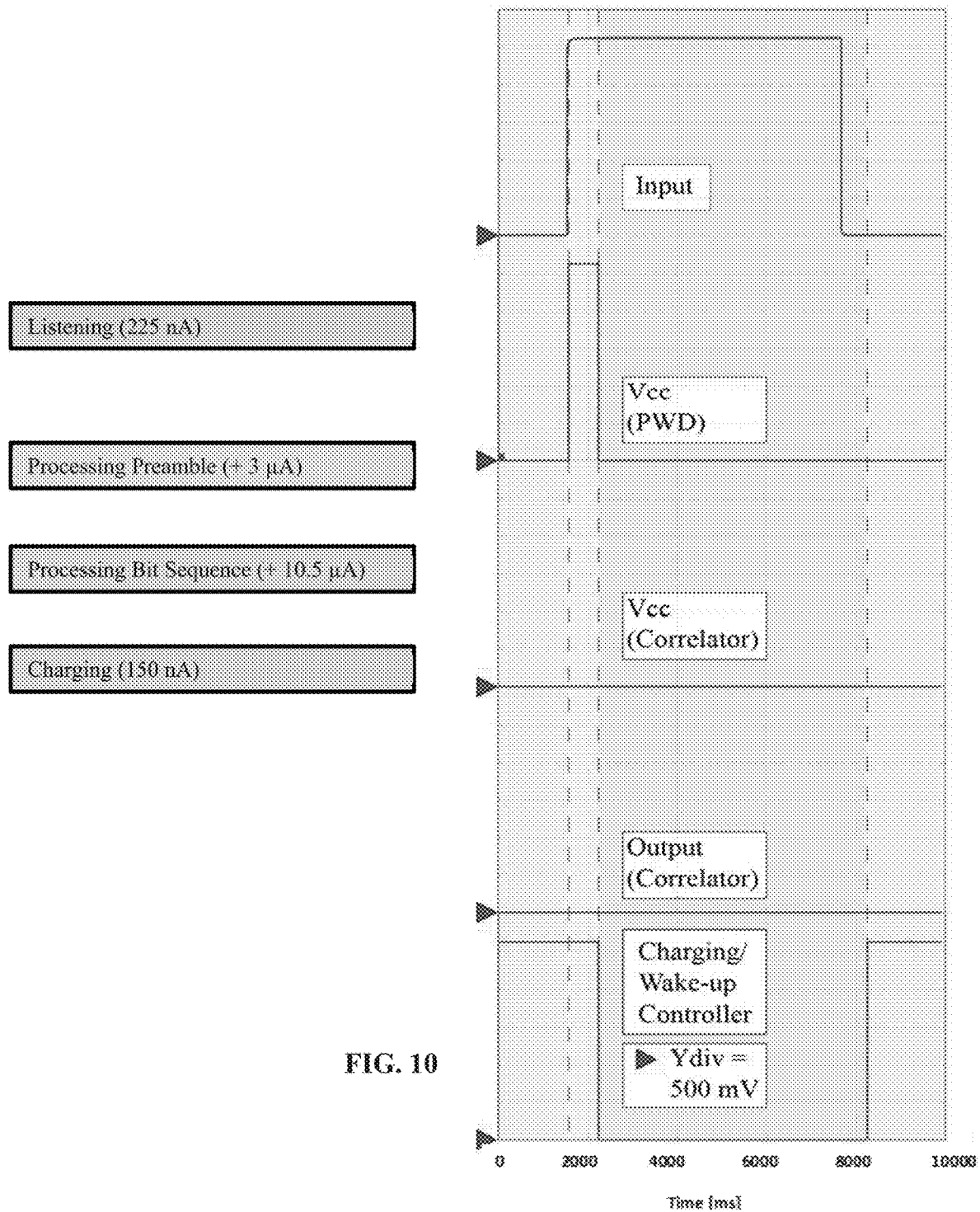
FIG. 10 is a graph that exhibits receiving a continuous signal causing the circuit to switch to the charging state, according to one embodiment.
Figure 3:
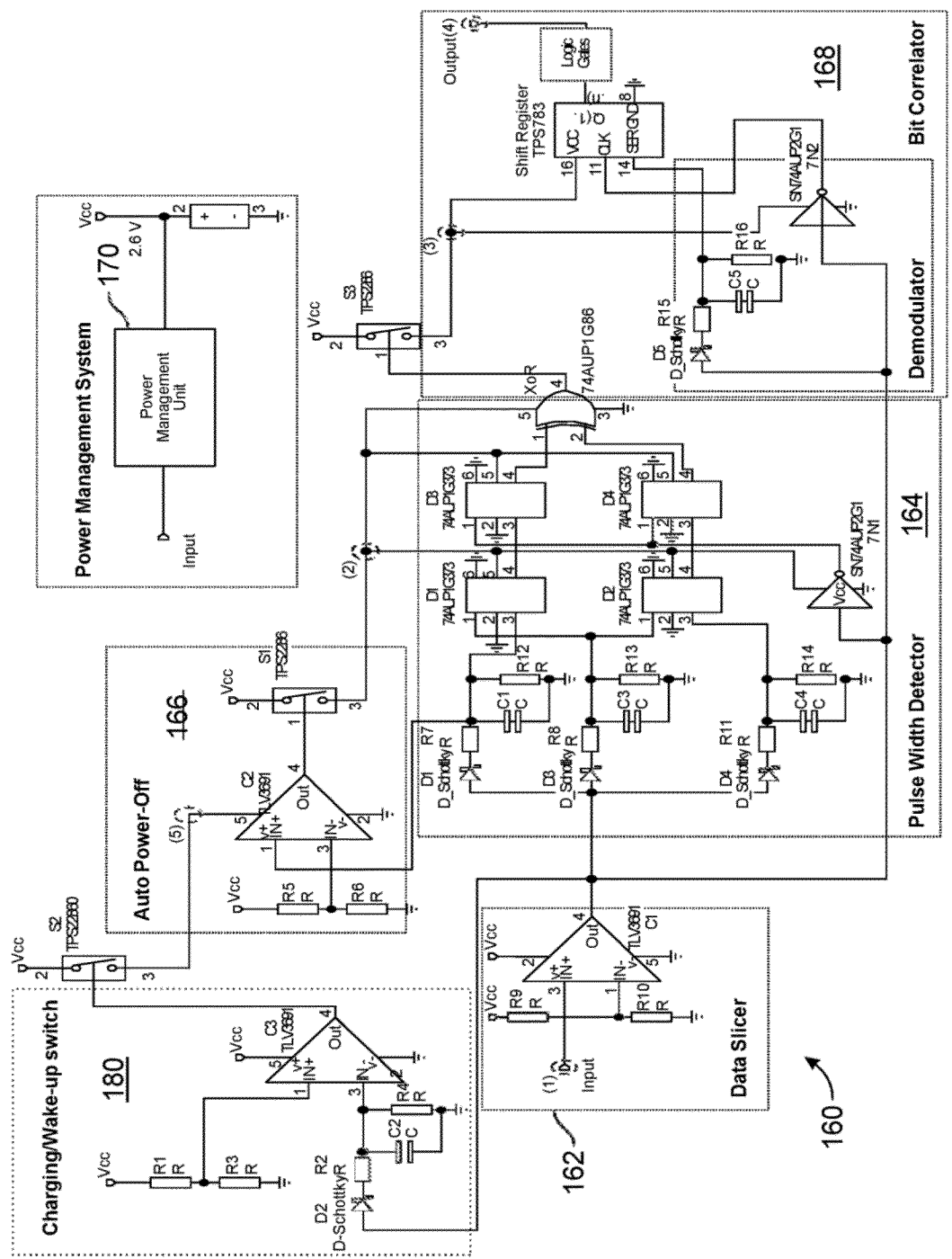

The detector starts from the listening state as no input is received. When the charging signal is received, it is treated as a preamble, and the detector moves to the processing preamble state. The preamble lasts enough time for the threshold detector to switch off the auto power-off timer and the detector moves to charging state. When the R2C2 voltage discharges below the threshold, the detector returns to the listening state, as shown in FIG. 10.

TABLE V

WuS Values for Example #5

| Component | Value |
| --- | --- |
| Preamble | ~6000 ms |
| g1 | NA |
| g2 | NA |
| 1-bit | NA |
| 0-bit | NA |

System

One embodiment of a Wi-Fi wireless communication system is described. In the Wi-Fi communication system, communications occur at 2.4 GHz or 5.8 GHz. Note that in alternative embodiments, communications in the wireless communication system occur at other radio frequencies.

In one embodiment, the Wi-Fi communication system is used as part of an IoT network to harvest and store RF energy (e.g., Wi-Fi, cellular, etc.), collect and process data, and communicate with other devices (e.g., Wi-Fi devices) using a communication standard (e.g., Wi-Fi, Zigbee, Bluetooth, Bluetooth Low Energy), or even proprietary interfaces.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module that may reside on a computer-readable or processor-readable storage medium. A non transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media.

Additionally, the operations of a method or algorithm may reside as one or any combination or set of codes and/or instructions on a non-transitory processor-readable medium and/or computer-readable medium, which may be incorporated into a computer program product.

REFERENCES

[1] Piyare, Rajeev, et al. "Ultra low power wake-up radios: A hardware and networking survey." IEEE Communications Surveys & Tutorials 19.4 (2017): 2117-2157.
[2] Oller, Joaquim, et al. "Has time come to switch from duty-cycled MAC protocols to wake-up radio for wireless sensor networks?." IEEE/ACM Transactions on Networking 24.2 (2015): 674-687.
[3] Khodr, Hala, et al. "Energy efficient IoT sensor with RF wake-up and addressing capability." IEEE sensors letters 1.6 (2017): 1-4.
[4] Benbuk, Ahmed Abed, et al. "A nano-Watt dual-mode address detector for a Wi-Fi enabled RF wake-up receiver." 2019 IEEE SENSORS. IEEE, 2019.
[5] Akan, Ozgur B., et al. "Internet of hybrid energy harvesting things." IEEE Internet of Things Journal 5.2 (2017): 736-746.
[6] Benbuk, Ahmed Abed, et al. "Leveraging UAVs for Passive RF Charging and Ultralowpower Wake-Up of Ground Sensors." IEEE Sensors Letters 4.5 (2020): 1-4.
[7] Bange, Joseph E., et al. "System and method for RF wake-up of implantable medical device." U.S. Pat. No. 8,639,339. 28 Jan. 2014.
[8] Gudan, Ken, et al. "Low power radio frequency communication." U.S. Pat. No. 9,245,158. 26 Jan. 2016.
[9] Heinzelman, Wendi, He Ba, and Li Chen. "Wireless sensor network wake-up range extension via energy harvesting and edge devices." U.S. Pat. No. 9,232,475. 5 Jan. 2016.

All publications and patent applications mentioned in this specification are herein incorporated by reference to the same extent as if each individual publication or patent application was specifically and individually indicated to be incorporated by reference.

While the invention has been described in connection with various embodiments, it will be understood that the invention is capable of further modifications. This application is intended to cover any variations, uses or adaptations of the invention following, in general, the principles of the invention, and including such departures from the present disclosure as, within the known and customary practice within the art to which the invention pertains.

What is claimed is:

1. A wireless communication in-band system comprising: a transmitter and a receiver; the transmitter generates a continuous signal at a frequency ($f_0$) to perform charging that is received by the receiver connected to an electronic device;
   the transmitter operates as a wake-up transmitter (WuTx) by transmitting a modulated wake-up signal (WuS) to trigger the electronic device from sleep to active mode; the transmitter transmits a continuous signal at $f_0$ to charge an energy storage element at the receiver; and the transmitter is a wake-up transmitter (WuTx) and the receiver is a wake-up receiver (WuRx), wherein the wake-up receiver will only generate a wake-up trigger to the electronic device if the correct wakeup signal (WuS) is received and matched from the wake-up transmitter, such that charging and wake-up operations occur at the frequency ($f_0$) and the receiver operates only at the frequency ($f_0$) to perform charging and wake-up.

2. A wireless communication system comprising:
   a. An antenna operating at a center frequency ($f_0$) implemented into a transmitter and a receiver;
   b. the transmitter that performs two functions:
      i. Operating as a wake-up transmitter (WuTx) by transmitting a wake-up signal (WuS) to trigger an electronic device from a sleep mode to an active mode;
      ii. Transmitting a continuous signal at $f_0$ to charge an energy storage element at the receiver, where the energy storage element is selected from the group consisting of: a battery, supercapacitor, and any other rechargeable direct-current (DC) voltage source;
   c. the WuS includes a sequence of bursts of a wireless signal to instruct a wake-up receiver (WuRx) to trigger the electronic device from the sleep mode to the active mode, wherein the WuS comprises:
      i. A preamble composed of a signal burst at $f_0$ that lasts for a specific period ($t_{preamble}$);

ii. The preamble is followed by silence with a period of guard time g1;

iii. A bit pattern includes a plurality of bursts at a frequency of $f_0$ with at least two possible periods representing a 1-bit or a 0-bit;

iv. The plurality of bursts are separated by silence with a period of guard time g2;

v. $f_0$ includes any value within the UHF, microwave, or millimeter wave ranges of the spectrum;

d. the WuRx decodes the WuS and generates a trigger signal to the electronic device, the WuRx comprises:

i. A matching network to maximize the power delivery between the antenna and a WuRx circuit;

ii. A rectifier that converts the received wireless signal at $f_0$ to DC voltage;

iii. An address detector comprising:
1. A data slicer that converts the input DC voltage into a plurality of digital pulses;
2. A pulse width detector (PWD) that generates a digital signal edge when a digital signal edge lasting for a specific period is applied to an input;
3. An auto power-off timer that generates the digital signal edge for a specific period after a digital signal edge is applied to its input;
4. A bit correlator that demodulates the plurality of input pulses into a 0- or 1-bit based their period and stores the demodulated input pulse values in a memory, and the bit correlator generates a digital signal edge only when a specific bit pattern is received;
5. A plurality of digitally controlled power switches to control the power delivery from an energy source to the active components of the address detector;

e. An energy management and storage system implemented at the receiver comprising:
i. A power management unit (PMU) that maximizes a power transfer between the rectifier and the energy storage element;
ii. the energy storage element;

f. A charging/wake-up switch implemented at the receiver to switch between charging and wake-up operations, comprising:

i. A threshold detector that monitors the period of a continuous digital signal edge applied to its input ii. A digitally controlled power switch to control the power delivery from the energy source to the active components of the address detector.

3. A method to reduce the average power consumption of the address detector by introducing multiple power consumption states, comprising:

a. an address detector powering on a data slicer, an auto power on/off timer, and a plurality of digitally controlled switches and remains in this state when no signal is detected by a receiver;

b. the address detector powering a pulse width detector (PWD) to examine a preamble composed of a signal burst at $f_0$ that lasts for a specific period ($t_{preamble}$);

c. the address detector powering a bit correlator to examine a bit pattern only if a preamble with a period of $t_{preamble}$ is received, wherein the bit pattern comprises a plurality of bursts at a frequency of $f_0$ with at least two possible periods representing a 1-bit or a 0-bit, and the plurality of bursts are separated by silence with a period of guard time g2;

d. the bit correlator generating a digital signal edge to trigger from the sleep mode to the active mode of an electronic device only if a specific bit pattern is received;

e. a switch disconnecting power from the address detector when a digital signal edge with a period exceeding threshold is received and only the data slicer remains powered on, wherein the switch comprises:

i. A threshold detector that monitors the period of a continuous digital signal edge applied to its input, and a digitally controlled power switch to control the power delivery from the energy source to the active components of the address detector;

f. Tuning the detector to detect a different pattern including a different preamble width and bit pattern, by varying the values of passive components including resistors and capacitors.

* * * * *

UNITED STATES PATENT AND TRADEMARK OFFICE
CERTIFICATE OF CORRECTION

PATENT NO. : 11,626,755 B2
APPLICATION NO. : 17/473045
DATED : April 11, 2023
INVENTOR(S) : Ahmed Abed Benbuk et al.

It is certified that error appears in the above-identified patent and that said Letters Patent is hereby corrected as shown below:

In the Drawings

DRAWING SHEET 3 of 11:
In FIG. 3, remove the "?" appearing in the circuitry. See attached replacement drawing sheet.

Signed and Sealed this
Eighth Day of August, 2023

Katherine Kelly Vidal
*Director of the United States Patent and Trademark Office*